United States Patent [19]

Yamaguchi et al.

[11] Patent Number: 4,671,085
[45] Date of Patent: Jun. 9, 1987

[54] VEHICLE GEAR SHIFT LEVER LOCKING APPARATUS

[75] Inventors: Isao Yamaguchi; Osamu Tada, both of Kanagawa, Japan

[73] Assignee: Isuzu Motors, Ltd., Japan

[21] Appl. No.: 627,068

[22] Filed: Jul. 2, 1984

[51] Int. Cl.⁴ ............................................. E05B 65/12
[52] U.S. Cl. ..................................................... 70/248
[58] Field of Search ................ 70/247, 248, 252, 238, 70/239; 74/483 R, 878

[56] References Cited

U.S. PATENT DOCUMENTS

| | | | |
|---|---|---|---|
| 2,147,613 | 2/1939 | Sandberg | 70/239 |
| 3,590,613 | 7/1971 | Kimberlin | 70/248 X |
| 3,748,880 | 7/1973 | Atkins | 70/248 |
| 4,235,123 | 11/1980 | Simancik et al. | 70/247 X |
| 4,249,404 | 2/1981 | Kimberlin | 70/248 |
| 4,270,624 | 6/1981 | Jessop | 74/483 R X |
| 4,282,769 | 8/1981 | Sandrock | 70/247 X |
| 4,474,085 | 10/1984 | DeVogelaere et al. | 70/248 X |
| 4,520,640 | 6/1985 | Kramer | 70/248 |

Primary Examiner—Richard E. Moore
Attorney, Agent, or Firm—John E. Toupal; Harold G. Jarcho

[57] ABSTRACT

A vehicle gear shift lever locking apparatus including a key operated lock mounted on a steering column of a vehicle and for controlling the ignition system thereof, the lock being movable between off and on positions and adapted to energize the ignition system in the on position and to effect deenergization thereof in the off position; a shift lever mounted remotely from the lock and movable between a park position and a plurality of drive positions, the lever adapted to deactivate the transmission in the park position and to activate the transmission in each of the drive positions; and a safety coupling coupled between the steering column mounted lock and the remotely mounted shift lever, the coupling adapted to prevent movement of the shift lever with the lock in the off position and to allow movement of the lever with the lock in the on position.

18 Claims, 10 Drawing Figures

VEHICLE GEAR SHIFT LEVER LOCKING APPARATUS

BACKGROUND OF THE INVENTION

1. Field of the Invention

The present invention relates generally to shift lever locking apparatus and, more particularly, to apparatus for automatically locking an automatic transmission shift lever of a parked vehicle.

2. Description of the Prior Art

Conventional vehicle automatic transmissions can be switched between park, reverse, neutral, drive, second and first operating condition by manipulation of a shift lever. While in the drive condition, the transmission gear ratio is automatically adjusted in response to the speed of the vehicle from stationary to high-speed. Since operation of the shift lever requires very little force, inadvertent shifting thereof sometimes creates a dangerous situation. For example, a child playing alone in a vehicle can easily move the shift lever from park to one of the drive positions. If, in that event, the vehicle is parked on an incline and the hand brake has been released, movement can occur.

A partial solution to the above problem is disclosed in published Japanese Patent Application No. 93044/73. Proposed thereby is a steering locking system in which an ignition key cannot be turned to an off position and removed unless the shift lever is switched to the park position. However, the system employs either a fluid actuator or an electromagnetic actuator responsive to the operation of the ignition key and is extremely complicated and quite costly. Also, although the steering is locked, the shift lever can still be moved from the park position to a drive position and, therefore, this prior system fails to completely eliminate the aforementioned danger.

OBJECT OF THE INVENTION

It is an object of the present invention, therefor, to provide an automatic transmission control apparatus which is simple in construction and wherein an ignition key cannot be removed unless a shift lever is set to a park position, and when the ignition key is in an off position the shift lever is automatically locked in the park position.

SUMMARY OF THE INVENTION

The invention is a vehicle gear shift lever locking apparatus including a key operated lock mounted on a steering column of a vehicle and for controlling the ignition system thereof, the lock being movable between off and on positions and adapted to energize the ignition system in the on position and to effect deenergization thereof in the off position; a shift lever mounted remotely from the lock and movable between a park position and a plurality of drive positions, the shift lever adapted to deactivate the vehicles transmission in the park position and to produce activation thereof in each of the drive positions; and a safety coupling coupled between the steering column mounted lock and the remotely mounted shift lever, the coupling adapted to prevent movement of the shift lever with the lock in the off position and to allow movement of the lever with the lock in the on position. The safety coupling prevents inadvertent shifting of the transmission after removal of its ignition key.

According to specific features of the invention, the safety coupling comprises a latch mechanism mounted on the steering column and responsive to movement of the lock, and a cable means connected between the latch mechanism and the lever and movable therewith; the latch mechanism being shaped and arranged to prevent movement of the cable with the lock in the off position. This arrangement provides the desired objectives with a simple inexpensive structure.

According to other features of the invention, the latch mechanism comprises a slide member connected to and movable with the cable, a latch pin movable between a latched position engaging an opening in the slide member to prevent movement thereof and an unlatched position disengaged from the opening in the slide member to permit movement thereof, and a cam coupled between the lock and the pin and adapted to move the pin into respectively the latched and unlatched positions in response to movement of the lock into the off and on positions. This latch mechanism is easily produced and assembled.

According to yet another feature of the invention the slide member is shaped and arranged to prevent registration of the opening and the latch pin with the lever in the drive positions and to thereby prevent in those positions latch pin and cam movements associated with movement of said lock into the off position. This arrangement prevents movement of the ignition key to an off position when the lever is in a drive position.

According to still another feature, the shift lever is mounted on the vehicle floor and the invention includes an arrest and release mechanism coupled to the shift lever and comprising a control pin for arresting or releasing movement of the shift lever, a control trigger for operating the control pin, and a control plate defining for the control pin different rest positions each associated with one of the park and drive positions of the shift lever; and the safety coupling comprises a bell crank with a pivotally mounted mid-portion, a bifurcated end arranged to receive the control pin when in a rest position associated with the park position of the shift lever, and an opposite end connected by the cable to the slide member. This arrangement provides the desired objectives for a floor mounted shift lever.

DESCRIPTION OF THE DRAWINGS

These and other objects and features of the invention will become more apparent upon a perusal of the following description taken in conjunction with the accompanying drawings wherein.

DESCRIPTION OF THE FIRST EMBODIMENT

Figure 1:
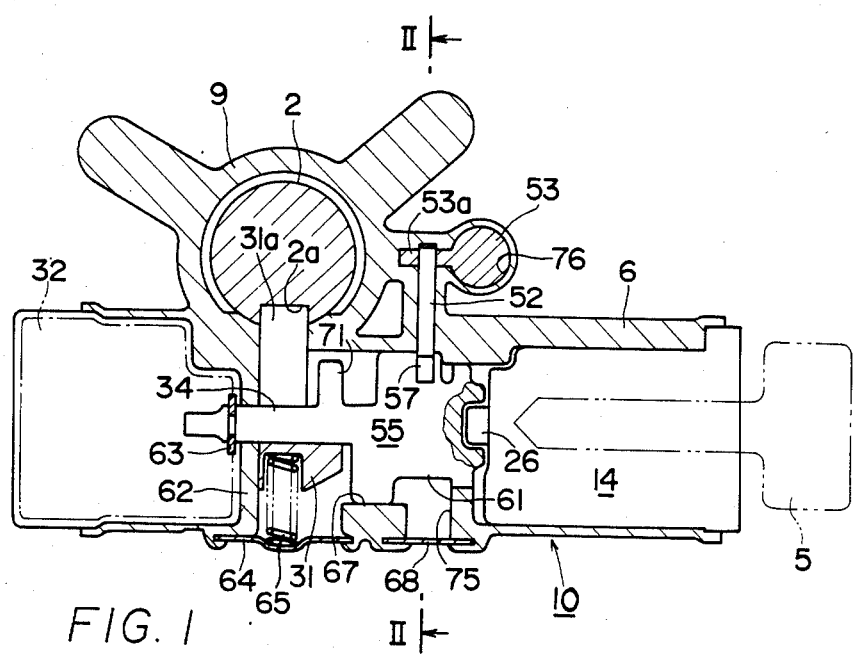
FIG. 1 is a plan sectional view of a shift lever locking apparatus in accordance with a first embodiment of the present invention.

As shown in FIG. 1, a steering column 9 is secured to a vehicle body (not shown) and retains a steering shaft 2. A substantially cylindrical housing 6 extends laterally from and is formed integrally with an upper part of the steering column 9. Operating a cylinder lock 14 is an engine ignition key 5 received by a right end portion of the housing 6. A cam member 55 is received by a central portion of the housing 6 and is in rotatative engagement with an engaging piece 26 of the cylinder lock 14. Switched by the cam member 55 is a start switch 32 received by a left end portion of the housing 6. The cam member 55 is rotatably supported at an intermediate portion by a cylindrical portion 67 of the housing 6, is supported at its end shaft portion 34 on an intermediate wall 62 of the housing 6 and is retained by a stop ring 63.

A steering column mechanism 10 includes a lock pin 31a with a base portion 31 biased by a spring 65 into engagement with the end shaft portion 34. When the lock pin 31a is projected into a groove 2a in the steering shaft 2, it can not be rotated. The spring 65 is interposed between the lock pin 31a and a cover 64 that closes an opening in an intermediate portion of the housing 6. When a cam 71 formed on the shaft portion 34 is rotated by the operation of the ignition key 5, the lock pin 31a is forced against the bias of the spring 65 into a position disengaged from the groove 2a of the steering shaft 2. The described steering column lock construction is similar to that of the prior art.

In the present invention, however, the cam 55 includes a small diameter shaft portion 61 on which is formed a radially projecting cam 57. Engaged by the cam 57 is a latch member 52 supported by the housing 6. The rectangularly shaped pin end of the latch member 52 is engagable and disengagable with an opening 53b (FIG. 2) provided in a projecting portion 53a of a latch slide member 53. Supporting the slide member 53 is a cylindrical portion 76 formed on the outer wall of the steering column 9. The slide member 53 can be slidably moved substantially parallel to the steering column 9 in association with the operation of an automatic transmission shift lever as will be described below.

Figure 2:
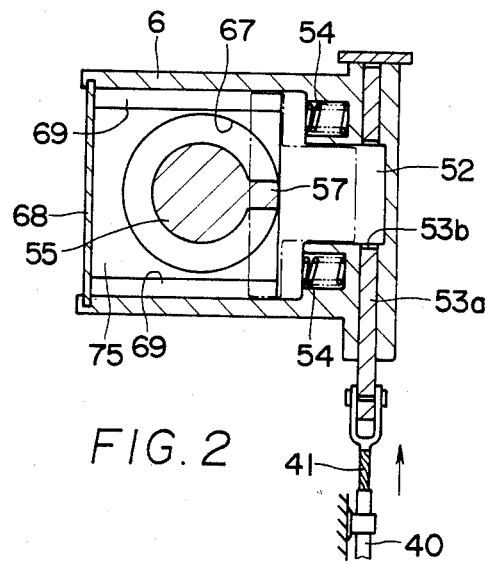
FIG. 2 is a sectional view in side taken on line II—II of FIG. 1.

As shown in FIG. 2, the portion 61 of the cam member 55 is smaller in diameter than a portion thereof retained by the cylindrical portion 67. The latch member 52 is slidably supported in a pair of guide grooves 69 formed in a space 75 within the housing 6 and is biased by a spring 54 into engagement with the cam 57. Closing the space 75 is a cover 68. Coupling the lock 14 to an automatic transmission shift lever 38 (FIG. 3) is a mechanical connector including the cam 57, the latch 52, the slide member 53 and a remote control cable 41 connected between the projecting piece 53a and the lever 38.

Figure 3:
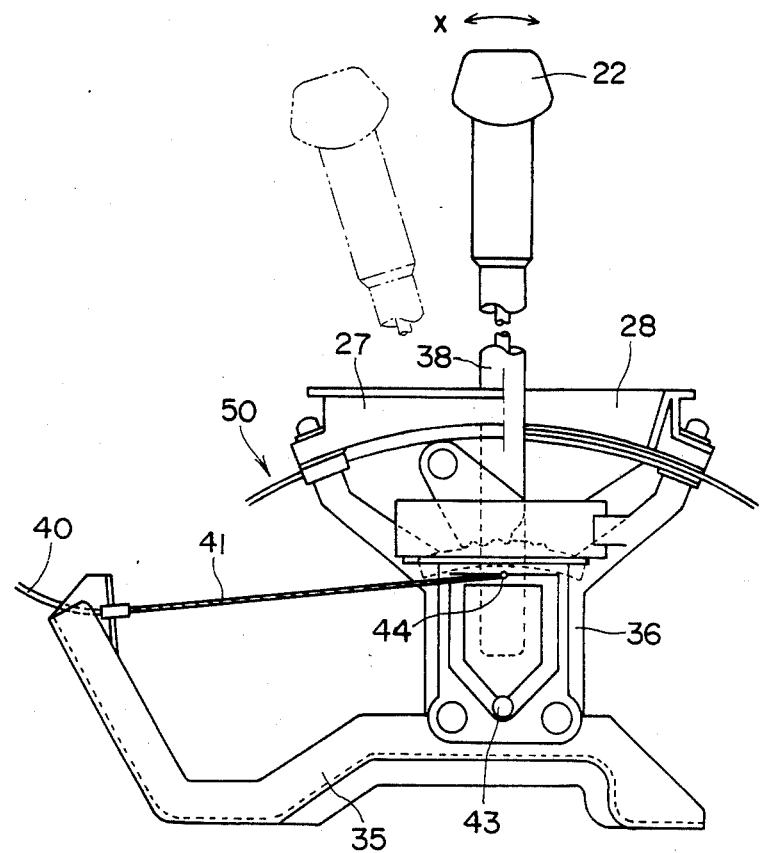
FIG. 3 is a side view showing the mounting construction of a shift lever of an automatic transmission.

As shown in FIG. 3, the shift lever 38 is retained by an operating box 36 secured to the vehicle body by brackets 35. Manipulation of shift lever knob 22 in a direction indicated by arrow x moves the lever 38 about a pivot 43 and along a groove 28 provided in the upper end of the operating box 38 and extending in a longitudinal direction. Such movement of the shift lever 38 shifts the transmission into a desired operating condition. An attachment portion 44 of the lever 38 is secured to one end of the remote control cable 41 which passes through a tube 40, the ends of which, respectively are secured to the bracket 35 and the steering column 9.

OPERATION OF THE FIRST EMBODIMENT

When the ignition key 5 is turned to either an on or start position, the pin 31a is pulled by the cam 71 out of the groove 2a in the steering shaft 2. At the same time, movement of the cam 57 allows the springs 54 to force the latch pin 52 out of the opening 53b from a latched to an unlatched position. Then, when the shift lever 38 is rotated from a park position indicated by broken lines in FIG. 3 to a drive position indicated by the solid lines or to any other desired drive position, the projecting piece 53a is pulled by the remote control cable 41 into a position in which the opening 53b is displaced and out of registration with of the latch member 52. Accordingly, interference between the latch pin 52 and the slide piece 53a prevents rotation of the cam 57 and the lock 14 toward its off position. Thus, the ignition key 5 cannot be removed from the lock 14 with the transmission activated.

When the shift lever 38 is shifted from the drive position indicated by the solid lines in FIG. 3 to the park position indicated by broken lines therein, the remote control cable 41 is urged leftwardly and the projecting piece 53a is returned to the position shown in FIG. 2 producing registration between the latch member 52 and the opening 53b. Then, when the ignition key 5 is rotated to the off position, the latch member 52 is pushed by the cam 57 of the cam member 55 against the force of the spring 54 into the opening 53b of the projecting piece 53a. In that state the ignition key 5 can be removed and the shift lever 38 is locked in the park position. Thus, the shift lever 38 cannot be moved inadvertently to a drive position.

DESCRIPTION OF THE SECOND EMBODIMENT

Figure 5:
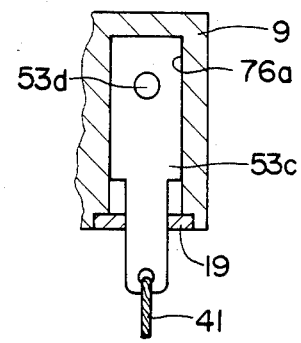
FIG. 5 is a front sectional view of the same.

In an embodiment shown in FIGS. 4–9, components the same as those in the embodiment of FIGS. 1–3 bear identical reference numbers. A rectangular recess 76a extends lengthwise of the steering column 9 and adjacent to the housing 6. Slidably retained in the recess 76a is a slide member 53c having an opening 53d. A latch pin 52b supported in the steering column 9, is engagable with and disengagable from the opening 53d. Biasing the pin 52b away from the opening 53d and into engagement with a cam 57 is a spring 59 fixed between the column 9 and a ring 52c. As shown in FIG. 5, the slide member 53c is retained in the recess 76a by a plate 19. An outer end of the slide member 53c is connected by a remote control cable 41 to an automatic transmission shift lever arrest and release mechanism 50a shown in FIG. 6.

The shift lever arrest and release mechanism 50a includes a shift lever 38a having a handle 22a. A trigger button 23 biased outwardly by a spring 21 is retained within a cylindrical portion of the handle 22a. Engaged with a cam groove 23a in the button 23 is a wedge-like cam 24 that is fixed to the upper end of a rod 25 extending into the hollow shift lever 38a. A guide block 29 is fixed to the lower end of the rod 25, and both ends of a control pin 1 supported thereby project into and are supported by a slot 30 provided in the shift lever 38a. Biasing the control pin 1 upwardly in a spring 17 interposed between the guide block 29 and the lower end wall of the shift lever 38a.

Secured to the lower end of the shift lever 38a is a member 11 pivotably supported on the pivot pin 43 retained by an immovable bracket. A control plate 15 is secured to and supported by an immovable sleeve 12 slipped over the pivot pin 43. Engaging one end of the control pin 1 is an opening 18 provided in the control plate 15.

Figure 8:
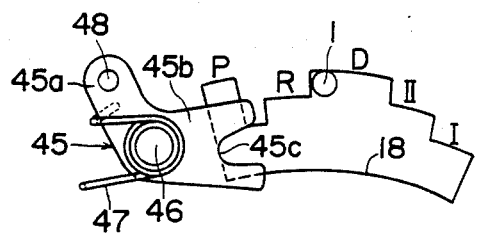
FIGS. 8 and 9 are, respectively, side views illustrating the operation of a locking mechanism in the shift lever shown in FIG. 6.
Figure 9:
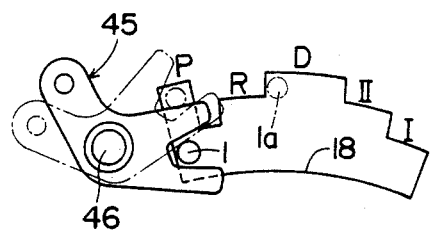

As shown in FIGS. 8 and 9, an upper edge of the opening 18 in the control plate 15 defines a plurality of notches P, R, D, II and I. When the control pin 1 engages each of the notches R, D, II and I, the automatic transmission is engaged, respectively, in reverse, drive, second gear and first gear. Manipulation of the lever 38a into a position that deactivates the transmission causes the control pin 1 to occupy the deeply cut notch P corresponding to park.

Figure 7:
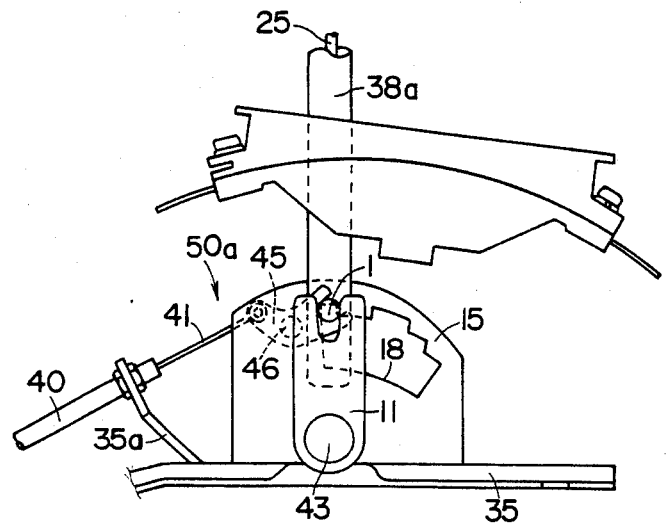
FIG. 7 is a side view of the same.

A bell crank 45 is pivotably supported by a pivot 46 on the control plate 15 adjacent to an edge of the opening 18. Wound about the pivot 46 is a spring 47 having one end fixed to the bell crank 45 and an opposite end fixed to the control plate 15. One end of the aforementioned remote control cable 41 is connected to a hole 48 formed in one arm of the bell crank 45. As shown in FIG. 7, the remote control cable 41 is inserted into a protective tube 40, both ends of which are secured to a fixed portion of the vehicle body. The other arm of the bell crank 45 defines a bifurcated portion 45c that engages the control pin 1 when the shift lever 38 is in the park position.

OPERATION OF THE SECOND EMBODIMENT

When the cylinder lock 14 is rotated by an ignition key into an on or engine start position, a lock pin is pulled out of a groove in a steering shaft in a manner similar to that described in connection with the embodiment shown in FIG. 1. At the same time, the projecting portion of the cam 57a is withdrawn, and the latch member 52b is disengaged by the spring 59 from the slide member 53c. Then, actuation of the trigger button 23 of the shift lever 38a forces the rod 25 and the control pin 1 downwardly moving the bell crank 45 into the position shown by solid lines in FIG. 9. Subsequent manipulation of the shift lever 38a into the drive position moves the control pin 1 into engagement with the notch D of the opening 18 as indicated by broken lines 1a in FIG. 9. At that time, the spring 47 holds the bell crank 45 in the position indicated by solid lines in FIG. 8. A similar result is provided by movement of the lever 38a into any of the other drive positions associated with the notches R, II and I in the opening 18. In response to such movements of the lever 38a, the control cable 41 pulls the slide member 53c to displace the hole 53d and eliminate registration thereof with the latch member 52b. Accordingly, an ignition key cannot be rotated to its off or removable position because engagement between the latch member 52b and the slide member 53c prevents required movement of the cam 57.

When the shift lever 38a again is shifted to the park position, the control pin 1 engages the bifurcated position 45c of the bell crank 45 as shown in FIG. 9. Subsequent release of the push button 23 allows the spring 17 to move the control pin 1 into engagement with the notch P of the opening 18 and the bell crank 45 is rotated counterclockwise against the force of the spring 47 as indicated by the broken lines in FIG. 9. Simultaneously, the slide member 53c is pushed into the recess 76a by the remote control cable 41 as shown in FIG. 5 and the hole 53d registers with the latch member 52b. Accordingly, an ignition key then is rotatable into its off and removable position as the latch member 52b enters the hole 53d in response to movement of the cam 57. With that condition the slide member 53c is latched and the cable 41, the bell crank 45, the control pin 1, the rod 25, the trigger button 23 and the shift lever 38a are all immovable. Thus, with an ignition key removed, the shift lever 38a is locked in the park position, and cannot be moved inadvertently.

DESCRIPTION OF THE THIRD EMBODIMENT

Figure 10:
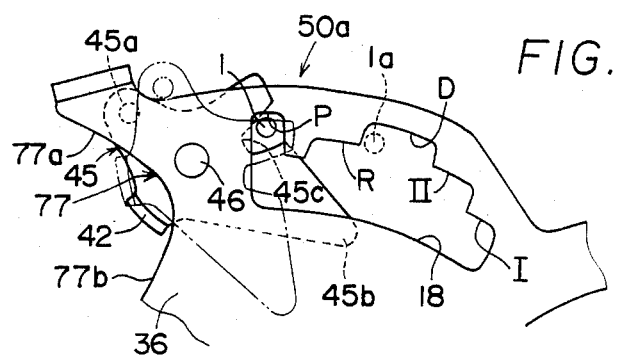
FIG. 10 is a side view similar to FIG. 7 and showing a partly modified embodiment of the present invention.
Figure 4:
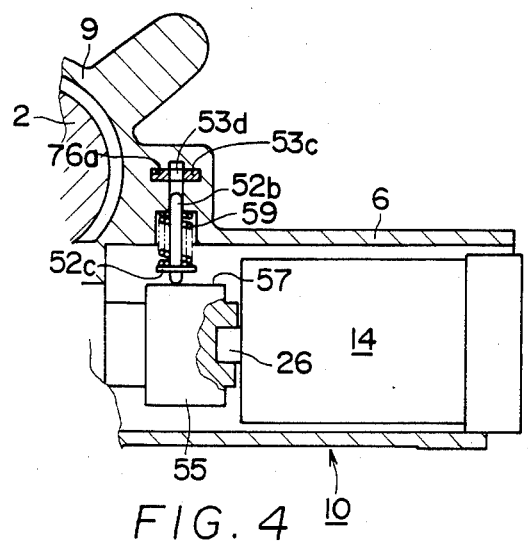
FIG. 4 is a plan sectional view showing essential parts of a steering column provided with a shift lever locking apparatus in accordance with a second embodiment of the present invention.
Figure 6:
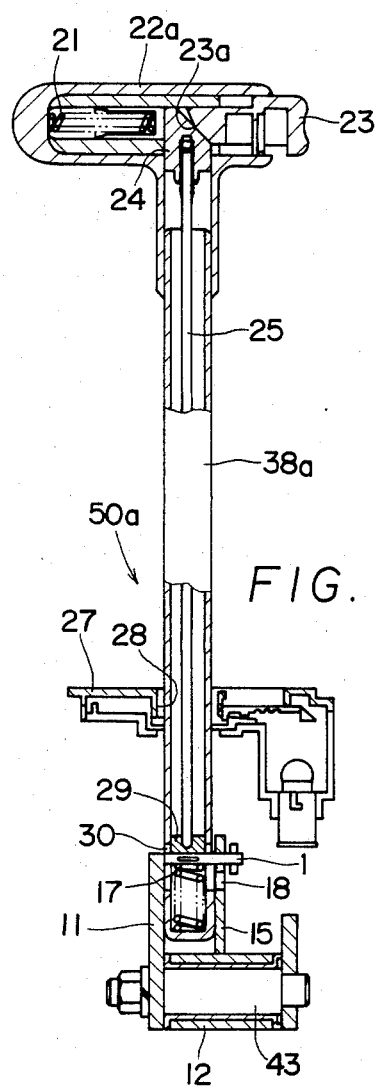
FIG. 6 is a front sectional view showing the construction of a shift lever of an automatic transmission.

In a modified embodiment shown in FIG. 10, a front edge of the operating frame or box 36 is provided with a cut 77 defined by edges 77a and 77b. The bell crank 45 is pivotably supported by the pivot internally of the operating box 36, and the remote control cable 41 is connected to the hole 48 of an end 45a. Another triangular end 45b is elongated and is provided with a cut 45c engagable with the control pin 1. An intermediate edge of the bell crank 45 is bent to form a projecting piece 42 which extends into the cut 77. When the shift lever 38a is in the drive position as shown, the bell crank 45 is turned clockwise about the pivot 46, the projecting piece 42 abuts against an edge 77a, and the cut 45c is directed towards the opening 18. Thus, when the shift lever 38a is pushed down to the park position, the control pin 1 smoothly engages the cut 45c. Also, even if the bell crank 45 is rotated counterclockwise from the position as indicated by the solid lines as the vehicle vibrates, the projecting piece 42 abuts against the edge 77b and is restrained thereby. At that time, the end 45b transverses obliquely the opening 18 as indicated by the broken lines, and therefore, when the shift lever 38a is pushed down to park position, the control pin 1 rides on the end 45b to return the bell crank 45 to the position as indicated by the solid lines whereby the control pin 1 is engaged with the cut 45c. In this embodiment, the range of rotation of the bell crank 45 is controlled by cooperation between the projecting piece 42 and the cut 77 without the provision of the spring 47 shown in FIG. 8. It will be noted that similar operation and results can be obtained by mounting the stopper which abuts against the end 45b on the inner wall of the operating box 36 rather than providing the projecting piece 42 on the bell crank 45.

In accordance with the present invention, therefore, an ignition key cannot be removed unless the shift lever is set to the park position, and thereafter both the steering and the shift lever 38 are locked in position. For those reasons, the possibility of either vandalism or theft of an unlocked vehicle is reduced. In addition, the invention prevents the dangerous occurence wherein an ignition key is turned inadvertently to the off position to lock the steering while the vehicle is moving. Moreover, the present invention is simple in construction and of lower cost than prior systems employing either a fluid pressure actuator or an electromagnetic actuator.

Obviously, many modifications and variations of the present invention are possible in light of the above teachings. For example, in the described embodiments, the remote control cable 41 can be replaced by a link mechanism. Also the latching members 52 and 53 of the present invention also can be used to render a handbrake unreleasable after removal of an ignition key. It is to be understood, therefore, that the invention can be practiced otherwise than as specifically described.

What is claimed is:

1. A vehicle gear shift lever locking apparatus comprising:
   a key operated lock mounted on a steering column of a vehicle and for controlling the ignition system thereof, said lock being movable between off and on positions and adapted to energize the ignition system in said on position and to effect deenergization thereof in said off position;
   a shift lever mounted remotely from said lock for shifting the transmission thereof, said lever being movable to a park position and to a plurality of drive positions and adapted to deactivate the transmission in said park position and to activate the transmission in each of said drive positions; and
   a safety coupling means coupled between said steering column mounted lock and said remotely mounted shift lever; said coupling means adapted to prevent movement of said shift lever with said lock in said off position and to allow movement of said lever with said lock in said on position and comprising a latch mechanism mounted on said steering column and responsive to movement of said lock, and a mechanical connector means connected between said latch mechanism and said lever and movable therewith; said latch mechanism being shaped and arranged to prevent movement of said connector means with said lock in said off position and comprising a reciprocable slide member connected to and movable with said connector means, a latch pin movable between a latched position engaging said slide member to prevent movement thereof and an unlatched position disengaged from said slide member to permit movement thereof, and a rotatable cam coupled between said lock and said pin and shaped and arranged to engage and move said pin into respectively said latched and unlatched positions in response to movement of said lock into said off and on positions; and wherein said slide member and said pin are movable in orthogonally related directions, and said slide member defines an opening for receiving said pin upon movement thereof into said latched position.

2. An apparatus according to claim 1 wherein said connector means comprises a cable connected between said latch mechanism and said lever.

3. An apparatus according to claim 2 wherein said latch mechanism comprises bias means biasing said pin into said unlatched position.

4. An apparatus according to claim 3 wherein said slide member is shaped and arranged to prevent registration of said opening and said latch pin with said lever in said drive positions and to thereby prevent in those positions latch pin and cam movements associated with movement of said lock into said off position.

5. An apparatus according to claim 1 wherein said coupling means is further adapted to prevent movement of said lock into said off position with said lever in said drive positions and to allow movement of said lock into said off position with said lever in said park position.

6. An apparatus according to claim 5 wherein said shift lever is mounted on the floor of the vehicle.

7. A vehicle gear shift lever locking apparatus comprising:
   a key operated lock mounted on a steering column of a vehicle and for controlling the ignition system thereof, said lock being movable between off and on positions and adapted to energize the ignition system in said on position and to effect deenergization thereof in said off position;
   a shift lever mounted remotely from said lock for shifting the transmission thereof, said lever being movable to a park position and to a plurality of drive positions and adapted to deactivate the transmission in said park position and to activate the transmission in each of said drive positions; and
   a safety coupling means coupled between said steering column mounted lock and said remotely mounted shift lever and adapted to prevent movement of said shift lever with said lock in said off position and to allow movement of said lever with said lock in said on position; said safety coupling means comprising a latch mechanism mounted proximate to said lock, a control means coupled to said shift lever, and a connector means joining said latch mechanism and said control means; and wherein said control means comprises:
   an arrest and release means coupled to said shift lever and comprising a control pin for arresting or releasing movement of said shift lever;
   a control trigger for operating said control pin;
   a control plate defining for said control pin different rest positions each associated with one of said park and drive positions of said shift lever; and
   a bell crank with a pivotally mounted mid-portion, one end arranged to engage and retain said control pin when in a rest position associated with said park position of said shift lever and to be disengaged from said control pin during movement of said shift lever into said drive positions, and an opposite end coupled to said lock.

8. An apparatus according to claim 7 wherein said one end of said bell crank is bifurcated to receive and retain said control pin.

9. An apparatus according to claim 8 wherein said bell crank is rotated in response to movement of said control pin into or out of said rest position associated with said park position of said shift lever.

10. An apparatus according to claim 9 wherein said arrest and release means comprises a bias means biasing said control pin toward said rest position.

11. An apparatus according to claim 10 wherein said coupling means comprises a latch mechanism mounted on said steering column and responsive to movement of said lock, and a mechanical connector means connected between said latch mechanism and said lever and movable therewith; said latch mechanism being shaped and arranged to prevent movement of said connector means with said lock in said off position.

12. An apparatus according to claim 11 wherein said connector means comprises a cable connected between said latch mechanism and said opposite end of said bell crank.

13. An apparatus according to claim 12 wherein said latch mechanism comprises a slide member connected to and movable with said connector means, a latch pin movable between a latched position engaging said slide member to prevent movement thereof and an unlatched position disengaged from said slide member to permit movement thereof, and a cam coupled between said lock and said pin and adapted to move said pin into respectively said latched and unlatched positions in response to movement of said lock into said off and on positions.

14. An apparatus according to claim 13 wherein said slide member and said pin are movable in orthogonally related directions, and said slide member defines an opening for receiving said pin upon movement thereof into said latched position.

15. An apparatus according to claim 14 wherein said latch mechanism comprises bias means biasing said pin into said unlatched position.

16. An apparatus according to claim 15 wherein said slide member is shaped and arranged to prevent registration of said opening and said latch pin with said lever in said drive positions and to thereby prevent in those positions movement of said latch pin and said cam associated with movement of said lock into said off position.

17. An apparatus according to claim 16 wherein said bell crank defines a projection portion, and including limit means for engaging said projection portion to limit the range of rotation of said bell crank.

18. An apparatus according to claim 16 including limit means for engaging said bifurcated end to limit rotation of said bell crank.

* * * * *